Nov. 28, 1961    A. F. DEUTH    3,011,092
AUTOMATIC HEADLIGHT DIMMER CONTROL CIRCUIT
Filed March 10, 1958

INVENTOR.
ALBERT F. DEUTH
BY J. B. Burke
ATTORNEY

United States Patent Office 3,011,092
Patented Nov. 28, 1961

3,011,092
AUTOMATIC HEADLIGHT DIMMER
CONTROL CIRCUIT
Albert F. Deuth, Hartsdale, N.Y., assignor to Clairex
 Corporation, New York, N.Y., a corporation of New
 York
Filed Mar. 19, 1958, Ser. No. 720,259
6 Claims. (Cl. 315—83)

This invention relates to the art of light responsive control systems and particularly concerns a photoelectrically operated system useful for dimming a first vehicle's headlights responsive to receipt of a light beam from the headlights of a second vehicle. This application is a continuation-in-part of my copending application Ser. No. 647,111, filed March 19, 1957, now Patent No. 2,912,593.

A principal object is to provide an electronic circuit useful in a photoelectrically operated headlight dimmer system.

A further object is to provide an electronic circuit for a photoconductive cell in which provision is made for increasing the speed of recovery of response of the circuit under a condition of overload illumination.

A still further object is to provide an electronic circuit for a photoconductive cell in which compensation is provided for the time constant characteristic of the photoconductive cell. Another object is to provide a photoelectrically operated control circuit for automatically dimming headlights in a vehicle, with provision for adjusting response of the circuit, for determining speed of recovery of the circuit after overload illumination, and for holding of the headlights in a dimmed condition upon increase in illumination of a photoconductive cell in the circuit.

Other and further objects and advantages of the invention will become apparent from the following description taken together with the drawing, wherein.

Figure 1:
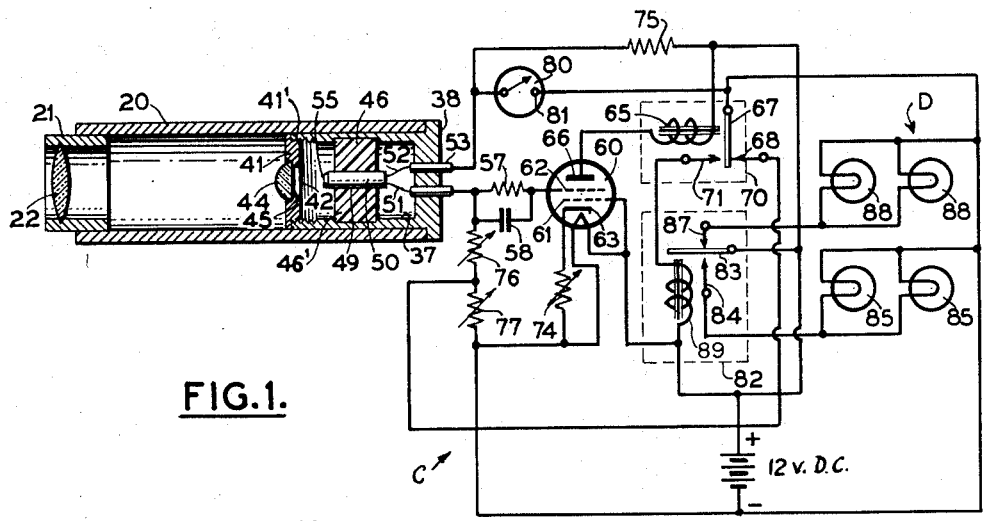
FIG. 1 is a diagram of an electronic circuit embodying the invention, with a portion of an associated optical assembly shown in plan central section.

Referring to FIG. 1, there is shown a cylindrical tube or shell 20 having an open end in which is adjustably disposed a cylindrical barrel 21. A double convex lens 22 is mounted in the barrel 21. Adjustably disposed in the other open end of the tube 20 is a cylindrical support member 37 which has a closed flanged end 38. The flange may be knurled or milled if desired to facilitate angular rotational adjustment. In its inner end the member 37 supports a flat circular disk 41 which has a rectangular aperture 42. The disk has a threaded shoulder 41' engaged in the threaded end of support 37. In aperture 42 is supported a cylindrical lens 44. This lens has flat semicircular faces which may be located substantially horizontally. Another disk 46 is mounted in member 37. This circular disk has its axis aligned with the axis of the tube 20 and member 37. Disk 46 has an aperture or passage 49 extending axially therein. Adjustably disposed in this passage is a cylindrical photoconductive cell 50. The optical axes of lenses 22 and 44 are disposed in alignment with each other and with the axes of tube 20, barrel 21 and cylindrical member 37. The photoconductive cell terminates in a pair of conductors or leads 51 and 52. The leads extend through apertures in the flanged end 38 of member 37 where they are connected to the control circuit generally designated as C.

The optical assembly of this system is explained in greater detail in my copending application Ser. No. 647,111, filed March 19, 1957, of which this application is a continuation in part. Photocell 50 may be of a photoconductive type employing crystalline cadium sulphide, cadmium selenide or the like as the photosensitive element 55 thereon. This photocell changes its electrical resistance depending on the amount of light illuminating the photosensitive element 55.

The optical system provides a horizontal response or horizontal light acceptance angle of ten to fifteen degrees and a vertical response or vertical light acceptance angle or approximately five degrees. The light acceptance angles in vertical and horizontal directions are the maximum angles in vertical and horizontal planes respectively to which it is desired that the system be responsive. The optical assembly is preferably mounted above the dashboard behind the windshield of an automobile so that it may be illuminated by headlights of an approaching vehicle.

The control circuit C of FIG. 1 is appropriate to the characteristics of the photoconductive cell employed in the system. The controlled devices D are the headlights 85 and 88 of the automobile or other vehicle in which the system is installed. Headlights 85 are the low beam lamps and headlights 88 are the high beam lamps.

In general photoelectric cells of the photoconductive type have an inherent time constant or time lag in operation which is characteristic of the particular photosensitive material. In order to meet a requirement for high speed of response or change in conductivity in a headlight dimmer system, the circuit C is adapted to compensate for any lag in photocell response due to overload illumination.

The circuit is also arranged to provide for operation at two response levels referred to herein as the "dimming sensitivity" and as the "holding sensitivity" respectively. When a first vehicle in which the present automatic headlight dimmer system is installed approaches a second vehicle coming toward it on the road, the second vehicle will normally have its headlights on high beam. According to the invention, the headlights of the first vehicle will be automatically changed to low beam and the driver of the second vehicle will normally respond and put his vehicle's headlights on low beam also. At this time the amount of light received by the automatic headlight dimmer system in the first vehicle will be substantially reduced and the headlights in the first vehicle would go back to high beam unless the sensitivity of the system were increased in order to hold it on low beam. The lower sensitivity of the system required to change from high beam to low beam is the dimming sensitivity, and the increased sensitivity due to the operation described below is the hold sensitivity. Thus for practical operations it is necessary to have built into the device a suitable holding-to-dimming or response ratio. This ratio is generally set into range of five to ten.

The circuit shown in FIG. 1 operates with a photocell 50 having a photoconductive element 55 subject to decrease in resistance when illuminated. The circuit includes a tetrode 60 having a control grid 62 arranged for low voltage operation. Relay 70 has its coil 65 connected in the circuit of plate 66. The relay has a movable contact 67 and fixed contacts 68, 71. Contact 71 is connected to the coil 89 of a relay 82. This relay has fixed contacts 84 and 87 connected to the low beam headlights 85 and high beam headlights 88 respectively. Movable contact 83 is connected to the positive terminal of a voltage source 90 which may be twelve volts. Contact 67 is connected to the negative terminal of voltage source 90. A bias resistor 74 having a low resistance value is connected in the circuit of cathode 63 connected to the negative terminal of voltage source 90, to reduce the plate current to a nominally low value insufficient to operate the relay. There is very little degeneration introduced by resistor 74 since it has a low resistance value. The current through the resistor being due principally to that drawn by the space charge grid 61. The input circuit includes a voltage dropping resistor 75, the photosensitive element 55 of photocell 50, and load resistors 76 and 77 all connected in series across the D.C. voltage source 90. The voltage may be twelve volts as indicated in the drawing or other suitable voltage. The arrangement is such that when relay 70 is deenergized contacts 67, 68 are closed and load resistor 77 is shorted out of the circuit. The voltage across the load resistors is applied to the control grid 62 of the tube through the R.-C. circuit consisting of resistor 57 shunted by capacitor 58.

In the absence of illumination, the photoelectric cell 50 has a very high electrical resistance and a negligibly small current flows through the load resistor 76 so that a negligible voltage is applied to the grid 62. Relay 82 is deenergized and high beam lamps 88 are on. The current now is in a condition of dimming sensitivity. If an appropriate level of illumination is now applied to the photocell, depending on the setting of the sensitivity control resistor 76 a sufficient positive signal will be applied at the control grid 62 to increase the current through the tube 60 and relay 70 will be actuated to cause contacts 67, 71 to close. When the relay closes, the short circuit across the resistor 77 is removed and the effective load resistance becomes the two series connected resistors 76 and 77. The circuit now has increased or holding sensitivity as determined by the sum of resistances of resistors 76 and 77. Then as the illumination of the photocell is reduced from the value required to trip the relay initially (on account of a change from high beam to low beam illumination by the approaching vehicle) relay 70 will remain closed until the illumination drops to a value determined by the sum of resistances of resistors 76, 77 at which value, the relay 70 will reopen. Thus the intensities of illumination at which the relay 70 opens and closes may be predetermined by the settings of resistors 76 and 77. Switch 80 may be a foot operated pushbutton switch. It removes the D.C. voltage from the photocell 50 and load resistors 76, 77 when it is closed since the negative D.C. voltage terminal will then be shifted to terminal 81. Switch 80 is provided to make this circuit inoperative to light falling upon the photocell so that the headlights can mechanically be put on high beam even though the intensity of light illuminating the photocell would be of sufficient magnitude to call for automatic low beam operation of the system.

When relay 70 becomes energized so that contacts 67, 71 close, relay 82 becomes energized and contacts 83, 84 close. This causes the power supply circuit for low beam lamps 85 to be completed and the lamps light. When contacts 83, 84 close, contacts 83, 87 which are normally closed, open to break the power supply circuit for high beam lamps 88. The circuit is now in a condition of increased sensitivity, the holding sensitivity condition referred to above. Subsequently, when relay 70 becomes deenergized, relay 82 also becomes deenergized and the power supply circuit for high beam lamps 88 is restored while the power supply of low beam lamps 85 is again interrupted.

In order to increase the speed of recovery of the system after an approaching vehicle has passed, under a condition of previous overload illumination of photocell 50 by high beam headlights of the vehicle, series resistor 57 shunted by capacitor 58 is provided in the circuit of grid 62. Amplifier tube 60 is normally biased so that its grid 62 is negative with no light or weak light illuminating the photocell. When a vehicle approaches and comes within range of the horizontal and vertical angles of response of the optical assembly the intensity of light illuminating the photocell will increase and the resistance of photoconductive element 55 will decrease to a point where there will be a positive voltage on grid 62. This positive voltage causes a grid current to flow and a charge will be built up on capacitor 58. The system operates to light low beam lamps 85 as explained above. As the approaching vehicle gets out of the range of the maximum horizontal and vertical light acceptance angles of the optical assembly quick recovery of the system is required. Grid 62 will assume a negative charge for a short time due to the charge on the capacitor and this will cause the plate current in the tube to drop rapidly and open relay 70. When relay 70 opens contacts 67 and 71 open and relay 82 also opens. Contacts 83 and 87 of relay 70 close to light the high beam headlights 88 and extinguish the low beam headlights. The change of the circuit to light the high beam headlights occurs very rapidly which is a desirable condition and occurs as soon as the approaching vehicle moves out of light acceptance range with respect to photocell 50 in the optical assembly. Resistor 57 serves as a protective resistor in case of overload voltage. Capacitor 58 which is shunted across resistor 57 makes the fast recovery from overload illumination possible and effective.

Figure 2:
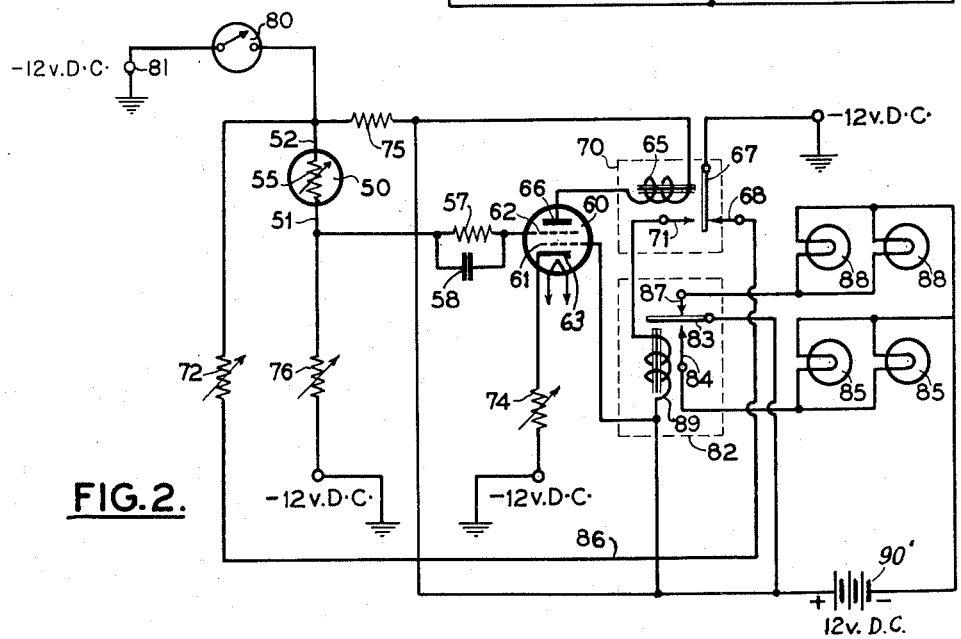
FIG. 2 is a diagram of another circuit embodying the invention.

In the circuit of FIG. 2 components identical to those of FIG. 1 are identically numbered and have functions as described above. Resistor 72 is connected directly between the photoconductive element 55 and relay contact 68 in line 86. When relay 70 is not actuated the sensitivity of the photocell is reduced since less than the full D.C. voltage (twelve volts) of voltage source 90' is applied to the element 55 due to the voltage drop in resistors 75 and 72. At such time contacts 67, 68 of relay 70 are closed, relay 82 is deenergized and high beam headlights 88 are lighted. The circuit is in a condition of reduced or dimming sensitvity which is adjustable by suitably setting the resistance value of resistor 76. When light from high beam headlights of an approaching vehicle illuminates the photocell 50, the resistance of element 55 drops. At this instant it is desired that the sensitivity of the circuit be increased. This increased or holding sensitivity will be determined by the resistance values of resistors 72 and 75. When the resistance of element 55 drops, space charge grid 62 becomes more positive; the plate current rises to energize relay 70 and contacts 67, 71 close. This energizes relay 82, and contacts 83, 84 close to extinguish the high beam headlights 88 and light the low beam headlights 85. The circuit is now in a condition of increased or holding sensitivity.

When the high beam headlights of the approaching vehicle are changed to low beam while the vehicle is still within light acceptance range of the optical assembly and photocell, it is desired that the circuit which has now switched on the low beam headlights 85 remain in the same condition. This is accomplished by continuing to apply substantially the full D.C. voltage (twelve volts) from voltage source 90' to the photocell so that the photocell remains at increased or holding sensitivity, until the approaching vehicle has passed.

The holding sensitivity in FIG. 2 is adjusted or set by resistors 72 and 75 independently of the dimming sensitivity control provided by resistor 76. This is considered a more advantageous arrangement than that of FIG. 1 where the holding sensitivity is determined by the resistance values of both resistors 76 and 77, and the dimming sensitivity is determined by the setting of resistor 76. Thus in the circuit of FIG. 1 there is an interdependence between the holding sensitivity and dimming sensitivity due to the common controlling resistor 76, while in the circuit of FIG. 2 the adjustments of the holding sensitivity and dimming sensitivity are independent of each other.

What is claimed is:

1. A headlight safety control circuit, comprising a high resistance photoconductive element, said element being responsive to a change in light level thereon to change said resistance, said element having an inherent time lag in responding to said change in light level thereon, a tube having cathode, grid and plate circuits, a voltage source having positive and negative terminals connected to the plate and cathode respectively, said grid being normally biased negatively by said source and assuming a positive charge to pass a grid current when said element has a high level of illumination, a relay having a coil disposed in said plate circuit, said relay having a movable contact and two fixed contacts, a first resistor connected between said grid and said element, a capacitor shunted across said resistor to be charged by said grid current, the charged capacitor instantly applying a negative bias to said grid to cut off current in said plate circuit instantly when said high level of illumination changes to a low level of illumination, second and third resistors connected in series with said element between said positive and negative voltage terminals, a fourth resistor, one of said fixed contacts being connected in series with said fourth resistor to a point between said second and third resistors, said movable contact being connected to said negative voltage terminal and being normally closed with one of said fixed contacts for lighting a high beam headlight, and relay means for extinguishing the high beam headlight when said movable contact is closed with the other of said fixed contacts, said movable contact being closed with said one contact to light instantly the high beam headlights when the plate current is cut off upon change of the high level of illumination to said low level of illumination, said second and fourth resistors coacting to determine the voltage applied to said element when the movable contact is closed with said one fixed contact to control holding sensitivity of the circuit, while the third resistor determines the voltage applied to the grid and controls dimming sensitivity of the circuit independent of the holding sensitivity control.

2. A headlight safety control circuit, comprising a high resistance photoconductive element, said element being responsive to a change in light level thereon to change said resistance, said element having an inherent time lag in responding to said change in light level thereon, a tube having cathode, grid and plate circuits, a voltage source having positive and negative terminals connected to the plate and cathode respectively, said grid being normally biased negatively by said source and assuming a positive charge to pass a grid current when said element has a high level of illumination, a relay having a coil disposed in said plate circuit, said relay having a movable contact and two fixed contacts, a first resistor connected between said grid and said element, a capacitor shunted across said resistor to be charged by said grid current, the charged capacitor instantly applying a negative bias to said grid to cut off current in said plate circuit instantly when said high level of illumination changes to a low level of illumination, second and third resistors connected in series with said element between said positive and negative voltage terminals, a fourth resistor, one of said fixed contacts being connected in series with said fourth resistor to a point between said second and third resistors, said movable contact being connected to said negative voltage terminal and being normally closed with one contact, and relay means in circuit with the other fixed contact, said relay means having two operating positions for switching from high beam headlights to low beam headlights when said movable contact moves from said one fixed contact to the other fixed contact, said movable contact being closed with said one contact to light instantly the high beam headlights when the plate current is cut off upon change of the high level of illumination to said low level of illumination, said second and fourth resistors coacting to determine the voltage applied to said element when the movable contact is closed with said one fixed contact to control holding sensitivity of the circuit, while the third resistor determines the voltage applied to the grid and controls dimming sensitivity of the circuit independent of the holding sensitivity control.

3. A headlight safety control circuit, comprising a high resistance photoconductive element, said element being responsive to a change in light level thereon to change said resistance, said element having an inherent time lag in responding to said change in light level thereon, a tube having cathode, grid and plate circuits, a voltage source having positive and negative terminals connected to the plate and cathode respectively, said grid being normally biased negatively by said source and assuming a positive charge to pass a grid current when said element has a high level of illumination, a relay having a coil disposed in said plate circuit, said relay having a movable contact and two fixed contacts, a first resistor connected between said grid and said element, a capacitor shunted across said resistor to be charged by said grid current, the charged capacitor instantly applying a negative bias to said grid to cut off current in said plate circuit instantly when said high level of illumination changes to a low level of illumination, second and third resistors connected in series with said element between said positive and negative voltage terminals, a fourth resistor, one of said fixed contacts being connected in series with said fourth resistor to a point between said second and third resistor, said movable contact being connected to said negative voltage terminal and being normally closed with said one contact, relay means in circuit with the other fixed contact, and high beam and low beam headlights in circuit with said relay means, said relay means having two operating positions for switching from the high beam headlights to the low beam headlights when said movable contact moves from said one fixed contact to the other fixed contact, said movable contact being closed with said one contact to light instantly the high beam headlights when the plate current is cut off upon change of the high level of illumination to said low level of illumination, said second and fourth resistors coacting to determine the voltage applied to said element when the movable contact is closed with said one fixed contact to control holding sensitivity of the circuit, while the third resistor determines the voltage applied to the grid and controls dimming sensitivity of the circuit independent of the holding sensitivity control.

4. In headlight safety control system, a circuit comprising a high resistance photoconductive element, said element being responsive to a change in light level thereon to change said resistance, said element having an inherent time lag in responding to said change in light level thereon, a tube having cathode, grid and plate circuits, a voltage source having positive and negative terminals connected to the plate and cathode respectively, said grid being normally biased negatively by said source and assuming a positive charge to pass a grid current when said element has a high level of illumination, a relay having a coil disposed in said plate circuit, said relay having a movable contact and two fixed contacts, a first resistor connected between said grid and said element, a capacitor shunted across said resistor to be charged by said grid current, the charged capacitor instantly applying a negative bias to said grid to cut off current in said plate circuit instantly when said high level of illumination changes to a low level of illumination, second and third resistors connected in series with said element between said positive and negative voltage terminals, a fourth resistor, one of said fixed contacts being connected in series with said fourth resistor to a point between the second and third resistors, said movable contact being connected to said negative voltage terminal and being normally closed with said one contact, and relay means in circuit with the other fixed contact, said relay means having two operating positions, for switching between high beam headlights and low beam headlights, said third resistor having a low resistance value with respect to said element when said element is not illuminated, said movable contact being connected to said negative terminal, said photoconductive element having a reduced voltage applied thereto when the element is not illuminated, said reduced voltage being set substantially by the resistance value of said second resistor, said high beam headlights being lighted while the photocell is not illuminated, and said photocell having an increased voltage applied thereto when the element is illuminated, said increased voltage being set by the third and fourth resistors substantially independently of the resistance value of the second resistor, said movable contact being closed with said one contact to light instantly the high beam headlights when the plate current is cut off upon change of the high level of illumination to said low level of illumination, said second and fourth resistors coacting to determine the voltage applied to said element when the movable contact is closed with said one fixed contact to control holding sensitivity of the circuit, while the third resistor determines the voltage applied to the grid and controls dimming sensitivity of the circuit independent of the holding sensitivity control.

5. A headlight safety control circuit having two levels of sensitivity, comprising a high resistance photoconductive element, said element being responsive to a change in light level thereon to change said resistance, said element having an inherent time lag in responding to said change in light level thereon, a space discharge tube having cathode, grid and plate circuits, a voltage source having positive and negative terminals connected to the plate and cathode respectively, said grid being normally biased negatively by said source and assuming a positive charge to pass a grid current when said element has a high level of illumination, a relay having a coil disposed in said plate circuit, said relay having a movable contact and two fixed contacts, said movable contact being connected to said negative voltage terminal, a first resistor connected between said grid and said element in series with the positive voltage terminal, a capacitor shunted across said resistor to be charged by said grid current, the charged capacitor instantly applying a negative bias to said grid to cut off current in said plate circuit instantly when said high level of illumination changes to a low level of illumination, second and third resistors connected in series with said element between said positive and negative voltage terminals, a fourth resistor, one of said fixed contacts being connected in series with said fourth resistor to a point between said second and third resistor, said movable contact being normally closed with said one contact, relay means in circuit with the other fixed contact, and high beam and low beam headlights in circuit with said relay means, said relay means having two operating positions for switching from the high beam headlights to the low beam headlights when said movable contact moves from said one fixed contact to the other fixed contact, one of said levels of sensitivity being a reduced dimming sensitivity controlled substantially by the second resistor alone, the other of said levels of sensitivity being an increased holding sensitivity controlled substantially by the third and fourth resistors independently of the second resistor, said movable contact being closed with said one contact to light instantly the high beam headlights when the plate current is cut off upon change of the high level of illumination to said low level of illumination.

6. A headlight safety control circuit, comprising a high resistance photoconductive element responsive to light received from headlights of an approaching vehicle to decrease said resistance, a tube having cathode, grid and plate circuits, a voltage source having positive and negative terminals connected to the plate and cathode respectively, a relay having a coil disposed in said plate circuit, said relay having a movable contact and two fixed contacts, said movable contact being connected to said negative voltage terminal, a first resistor connected between said grid and said element in series with the positive voltage terminal, a capacitor shunted across said resistor, second and third resistors connected in series with said element between said positive and negative voltage terminals, a fourth resistor, one of said fixed contacts being connected in series with said fourth resistor to a point between said second and third resistors, said movable contact being normally closed with said one contact, means for lighting a high beam headlight when said movable contact is closed with said one contact, and means for lighting a low beam headlight and extinguishing the high beam headlight when said movable contact is closed with the other of said fixed contacts, said element having maximum sensitivity determined by said third and fourth resistors when substantially the full voltage of said source is applied to said element, said element having minimum sensitivity determined by the second resistor substantially independently of the third and fourth resistors when less than the full voltage of said source is applied to said element.

References Cited in the file of this patent
UNITED STATES PATENTS

| | | |
|---|---|---|
| 1,618,816 | Davies | Feb. 22, 1927 |
| 2,797,364 | Mulligan | June 25, 1957 |
| 2,848,651 | Byrne | Aug. 19, 1958 |
| 2,876,395 | Miller | Mar. 3, 1959 |
| 2,917,665 | Carpenter | Dec. 15, 1959 |